Aug. 8, 1933.  C. A. THELANDER  1,921,793

SPRING TESTING MACHINE

Filed March 1, 1928

Inventor:
Carl A. Thelander
By
Wilson & McCanna
Attys.

Patented Aug. 8, 1933

1,921,793

UNITED STATES PATENT OFFICE 1,921,793

SPRING TESTING MACHINE

Carl A. Thelander, Rockford, Ill., assignor, by mesne assignments, to Borg-Warner Corporation, Chicago, Ill., a Corporation of Illinois Application March 1, 1928. Serial No. 258,255

2 Claims. (Cl. 73—51)

This invention relates to a power operated, hand fed spring testing machine.

In the testing of springs, such as coiled compression springs, it has been customary to perform the operation entirely by hand, using a lever pulled down by hand to compress each spring to the desired amount on the platform of a scale, the hand of which designates the amount of pressure in pounds or other suitable units. The principal object of the present invention is to provide a power operated machine for performing the operation referred to whereby one operator can readily do the work of two or even more without showing fatigue, the operation being reduced simply to the matter of inserting springs, one after another, beneath a presser foot on a continuously reciprocated plunger and simultaneously noting the scale reading to determine whether a spring conforms to a predetermined set standard or is too weak or too strong.

In the machine of my invention I provide in connection with a scale platform a continuously reciprocated plunger operating vertically above the platform, the plunger having a presser foot fixed adjustably on the lower end thereof and arranged to be set to leave a predetermined required clearance between it and the platform at the lower end of its stroke to the end that one may determine the load a spring will be under when compressed to a certain prescribed length, the loading of the spring being indicated by the reading on the dial of the scale. I prefer to operate the plunger in such a way that the same will have a sufficient pause at the lower end of its stroke to allow the indicator hand of the scale enough time to cease vibrating so that a reading can be made without eyestrain, the means employed in the present embodiment being a rocker beam operated by a pitman rod connected with a crank element, the crank at dead center causing the plunger to hesitate long enough to avoid the excessive vibration of the indicator hand. I also prefer to provide means for adjusting the relationship between the plunger and the scale platform to take different lengths of springs where the adjustment is not within the limits afforded by the adjustable presser foot, and also provide means whereby the length of stroke of the plunger may be varied to suit requirements.

The invention is illustrated in the accompanying drawing wherein—

The same reference numerals are applied to corresponding parts throughout the views.

Figure 1:
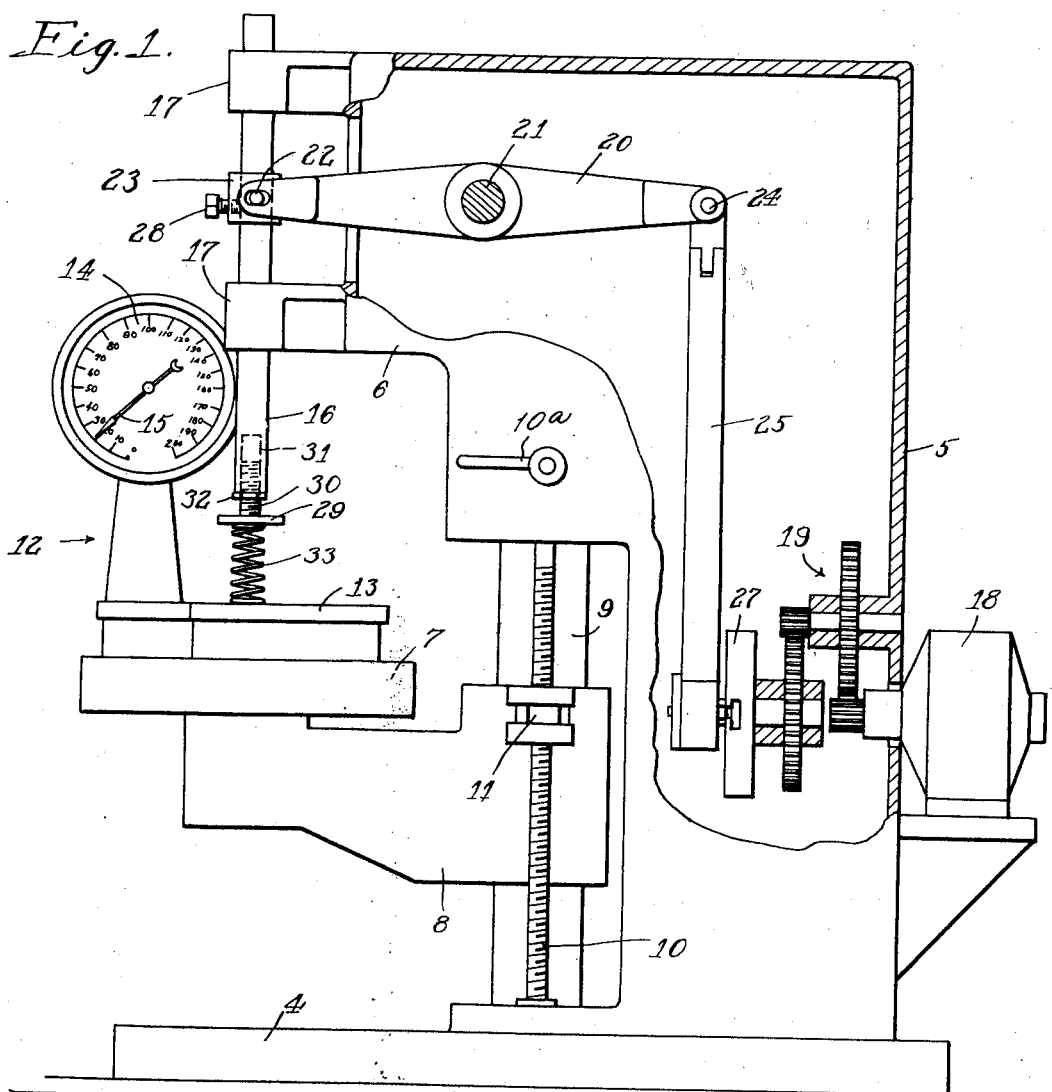
Figure 1 is a side view of a spring testing machine embodying my invention.

The machine comprises a base 4 having a hollow column 5 rising therefrom. The head end 6 of the latter overhangs a table 7 carried by a bracket 8 adjustably mounted on the post 9, the adjustment means suitably comprising a screw 10 operating in a nut 11 carried by the bracket 8 and the screw being operable by hand or by power. A hand crank 10a is connected with the screw 10 by means of suitable gearing whereby operation of the crank 10a will cause rotation of the screw 10. The table 7 forms a rigid support for a scale 12 which may be of any suitable or preferred type having a platform 13, dial 14, and indicator hand 15. A plunger 16 is received in bearings 17 provided on the head 6 and is arranged to reciprocate vertically above the platform 13 at a rate determined by the speed of the electric motor 18 and reduction gearing 19 provided for the operation of the machine by power. Any suitable means may be employed providing a connection between the plunger 16 and the reduction gearing 19. In the present embodiment I have shown a rocker beam 20 pivoted in the head 6, as at 21, having sliding pivotal connection at 22 with a collar 23 fixed on the plunger 16 between the bearings 17. The other end of the rocker beam 20 has pivotal connection at 24 with a pitman rod 25 connected by a crank pin 26 with a crank element 27 driven by the terminal gear of the reduction gearing 19. It will be evident from the description as thus far advanced that in the operation of the motor 18 the plunger 16 is continuously reciprocated toward and away from the platform 13 at a rate detremined, as stated before, by the speed of the motor and the drive ratio afforded by the reduction gearing 19.

In the testing of coiled compression springs, for example, it is desired to know what pressure a spring develops when compressed to a certain length. The clearance between the lower end of the plunger 16 and the scale platform 13 must, therefore, be capable of adjustment to suit the requirements of the springs being tested. As stated before, the table 7 may be raised and lowered to change the relation between the plunger 16 and the scale platform 13. I have also shown a set screw at 28 whereby the collar 23 may be fixed to the plunger 16 in any desired position so that the plunger may be raised or lowered with respect to the platform when the set screw is loosened and then, after the desired clearance is arrived at, the set screw may be tightened to hold the parts in adjusted position. A presser foot 29 has a threaded shank 30 threading in a hole 31 provided in the lower end of the plunger 16 so that a fine adjustment may be made in the relation of the plunger to the platform. A lock nut 32 threading on the shank 30 is arranged to jam against the lower end of the plunger to maintain the presser foot in its adjusted position. In operation, the operator in testing each spring, such as that represented at 33, inserts the same beneath the presser foot in the raised position of the plunger. Then, when the plunger is depressed he observes the dial to determine the load exerted by the spring, it being understood that the plunger has been adjusted so as to leave the proper clearance between the presser foot 29 and the platform 13 with the spring in place therebetween and under compression. For example, if it is desired to know what load a spring three inches long will be under when compressed to a length of, say, two inches then the presser foot should have a clearance of exactly two inches with respect to the platform with the spring compressed therebetween. It will be obvious that the plunger may be depressed as many as thirty times per minute and still afford enough of a time interval for the operator to get a reading off the dial without too much eyestrain. As stated before, the operation of the plunger by the crank and pitman rod insures enough of a dwell of the plunger at the lower end of its stroke to allow the indicator hand 15 to come to a standstill at a certain point on the dial. With ordinary skill, an operator experiences no difficulty in removing one spring and substituting another to keep up with the speed of operation of the plunger so as to test thirty or more springs per minute, which is approximately twice the output produced with an ordinary hand operated spring testing rig. Thus, a large number of springs of a certain length for a certain prescribed purpose may be tested for uniformity at a very low labor cost and such springs as prove to be too weak or too strong may be laid aside as unfit for the particular purpose contemplated.

Figure 2:
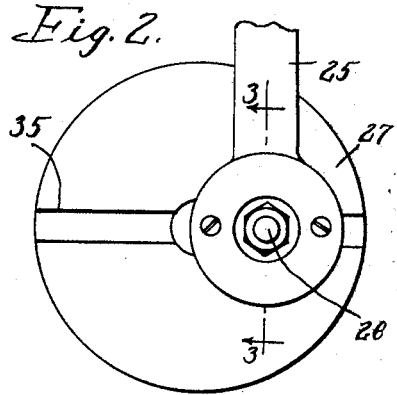
Fig. 2 is an enlarged elevational view of the connection between the power operated crank and the pitman rod.
Figure 3:
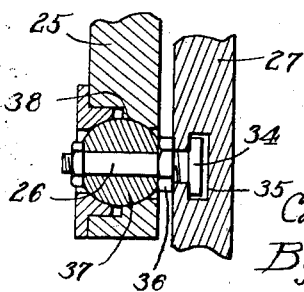
Fig. 3 is a section taken on the line 3—3 of Fig. 2.

In Figs. 2 and 3 I have shown an adjustment whereby the length of stroke of the plunger 16 may be varied to suit the requirements of different jobs. It will be evident that by simply changing the throw of the crank pin 26 the length of stroke of the plunger is accordingly varied. With this end in view I provide the crank pin 26 in the form of a bolt having a T head 34 adjustably mounted in a T slot 35 extending diametrically across the face of the disc-shaped crank element 27. A nut 36 threading on the shank near the head 34 is arranged, when tightened, to hold the pin 26 in any desired position in the slot 35. The ball 37 received in the socket 38 in the lower end of the pitman rod 25 provides a suitable universal joint connection allowing for the rotation of the pitman rod 25 relative to the crank pin 26 as required in operation.

It is believed the foregoing description conveys a clear understanding of my invention and of its various objects and advantages. While reference has been made particularly to the use of the machine for the testing of coiled compression springs it will be apparent that other kinds of springs, or for that matter, other kinds of materials might also be susceptible of being tested. The claims have, therefore, been drawn with a view to covering all legitimate modifications and adaptations of the invention.

I claim:

1. A machine for measuring the compressive strength of coil springs comprising a frame, a vertically adjustable bracket on said frame, a force measurement platform on said bracket positioned to serve as a lower abutment for a coil spring under test, a force indicating dial having a pointer, means connecting said pointer to said platform to indicate the force exerted by said spring, a plunger above said platform reciprocable toward and away from said platform, a presser foot adjustable on the lower end of said plunger and serving as an upper abutment for said spring, a pivotally supported lever having one end thereof releasably secured to said plunger for driving said plunger and varying the clearance between said presser foot and said platform, an adjustable pitman secured to the opposite end of said lever for oscillating said lever and reciprocating said plunger through any of a plurality of strokes, and means for continuously driving said pitman.

2. In a testing machine of the character described for measuring the compressive strength of coil springs, the combination of a force-measurement platform, a plunger reciprocable toward and away from the platform, a power operated means for reciprocating said plunger including a motor and an adjustable pitman for converting the rotary motion of the motor into reciprocal motion of variable stroke, means for obtaining a predetermined clearance between the plunger and the platform at the end of each reciprocation, for the purpose of compressing each spring inserted therebetween to a predetermined extent, dial means for visually indicating the force exerted on said platform by the compression of said springs, and means for adjusting the position of the force-measurement platform with respect to the plunger.

CARL A. THELANDER.